US008212844B2

(12) United States Patent
Thebault et al.

(10) Patent No.: US 8,212,844 B2
(45) **Date of Patent: *Jul. 3, 2012**

(54) METHOD AND DEVICE FOR ENCODING VIDEO LEVELS INTO SUBFIELD CODE WORDS

(75) Inventors: Cedric Thebault, Villingen-Schwenningen (DE); Carlos Correa, Villingen-Schwenningen (DE); Sebastien Weitbruch, Kappel (DE)

(73) Assignee: Thomson Licensing, Issy-les-Moulineaux (FR)

( * ) Notice: Subject to any disclaimer, the term of this patent is extended or adjusted under 35 U.S.C. 154(b) by 1066 days.

This patent is subject to a terminal disclaimer.

(21) Appl. No.: 12/156,493

(22) Filed: Jun. 2, 2008

(65) Prior Publication Data

US 2008/0310824 A1 Dec. 18, 2008

(30) Foreign Application Priority Data

Jun. 18, 2007 (EP) .................................... 07301120

(51) Int. Cl.
*G09G 5/02* (2006.01)
*G09G 5/10* (2006.01)
*H04N 7/24* (2006.01)

(52) U.S. Cl. ........ 345/690; 345/596; 345/691; 345/692; 345/693; 348/471; 348/472

(58) Field of Classification Search .............. 345/60–72, 345/690–697, 596; 348/471, 472
See application file for complete search history.

(56) References Cited

U.S. PATENT DOCUMENTS

| | | | | |
|---|---|---|---|---|
| 6,396,508 | B1 * | 5/2002 | Noecker | 345/693 |
| 6,559,816 | B1 | 5/2003 | Koo et al. | |
| 7,345,682 | B2 * | 3/2008 | Honda et al. | 345/204 |
| 7,804,509 | B2 * | 9/2010 | Thebault et al. | 345/691 |
| 2003/0137473 | A1 * | 7/2003 | Weitbruch et al. | 345/60 |
| 2008/0204372 | A1 * | 8/2008 | Correa et al. | 345/60 |

FOREIGN PATENT DOCUMENTS

| | | | |
|---|---|---|---|
| EP | 1 426 915 | A | 6/2004 |
| EP | 1426915 | | 9/2004 |
| EP | 1 768 088 | A | 3/2007 |
| EP | 1768088 | | 3/2007 |
| JP | 2001083929 | | 3/2001 |
| JP | 2005031467 | | 2/2005 |
| JP | 2005128133 | | 5/2005 |
| JP | 2007086788 | | 4/2007 |

OTHER PUBLICATIONS

Search Report Nov. 6, 2007.

* cited by examiner

*Primary Examiner* — M Good Johnson
*Assistant Examiner* — Jed-Justin Imperial
(74) *Attorney, Agent, or Firm* — Myers Wolin, LLC

(57) ABSTRACT

A method and a device for encoding the video level of a pixel of a picture into a subfield code word in a display device using a PWM (Pulse Width Modulation) technology and subfields for displaying video picture. The bits of the subfield code word are computed recursively one after the other from the bit having the most significant weight to the bit having the least significant weight. In determining the state of a bit of the subfield code word, a first threshold and a second threshold is associated with the bit, the second threshold being greater than the first threshold, and the video level to be encoded by this bit and its following bits in the subfield code word are compared to the first and second thresholds. A state is allocated to the bit based on the comparison.

8 Claims, 6 Drawing Sheets

METHOD AND DEVICE FOR ENCODING VIDEO LEVELS INTO SUBFIELD CODE WORDS

This application claims the benefit, under 35 U.S.C. §119, of European Patent Application No. 07301120.7 filed Jun. 18, 2007.

FIELD OF THE INVENTION

The invention relates to a method and a device for encoding the video level of a pixel of a picture into a subfield code word in a display device. It can be applied to every display device using a PWM (Pulse Width Modulation) technology and sub-fields for displaying video picture.

BACKGROUND OF THE INVENTION

The sub-field encoding part of a display using PWM technology is one of the most important parts of the display device since the encoding is responsible of the gray-scale portrayal (linearity and level of noise dithering) and of the motion rendition (level of false contour).

The goal of the sub-field encoding is to fill up a sub-fields memory with subfields data. The subfield data of a pixel is a code word wherein each bit is representative of the state, "ON" or "OFF", of this pixel during a subfield of the video frame. This sub-fields memory will be read during the next frame, sub-field by sub-field, whereas it is written pixel by pixel. This information is used directly to control the display device.

The subfield encoding step is generally done after a degamma function as shown in FIG. 1. The degamma function is first applied to the input video levels. These levels are then coded by the sub-field encoding step into subfield code words. The subfield encoding step is eventually preceded by a dithering step. The subfield code words are then stored in a subfields memory.

In a standard approach, the encoding step is implemented by using a simple look-up table. A subfield code word is associated with each video level.

Some problems can not be solved at all or in a simple way when using this standard approach. This is the case of line load effect problem where the light emitted by a current pixel for a given video level can vary according to the load of the line of pixels to which the current pixel belongs. This problem can not be solved completely by using the standard approach. It is the same for the linearity problem when an average power level is controlled in the display device.

The line load effect is illustrated by FIGS. 2 and 3. The FIG. 2 shows a test picture (a white cross on a black background) to be displayed by a display device suffering from a problem of line load effect. The first and the last lines are black for one half of the pixels, and white for the other half. The middle lines are white. The FIG. 3 shows the picture as it is displayed by the display device. The line load effect is visible on the middle lines. This effect can be explained as follows: when a sub-field is used on a whole line its luminance is decreased by 20% compared to its luminance on a line where it is not used. The value of 20% is given as an example. The video level of the pixels of the middle lines is thus $255\cdot(1-(1-½)\times0.20)=229.5$ while the white pixels of the other lines have a luminance of $255\cdot(1-(1-1)\times0.20)=255$.

EP 1 768 088 discloses a recursive method to compute the sub-field code word from the bit associated with the most significant sub-field (sub-field having the highest weight) to the bit associated with the least significant sub-field (sub-field having the lowest weight). If the video level to be encoded is greater than or equal to a threshold associated with the sub-field, a state "ON" (or "1") is allocated to the bit corresponding to this sub-field. The threshold associated with a given sub-field is the sum of the weights of the sub-field having a lower weight than the considered sub-field plus one.

This recursive method has a contour noise level similar to a standard coding without false contour optimization. This is due to the fact that each sub-field has a hard switch function i.e. a sub-field is not used at all if the video level to be encoded is lower than a threshold and is used completely for all the video levels equal to or greater than this threshold.

SUMMARY OF THE INVENTION

It is an object of the present invention to disclose a method adapted to reduce the false contour effects.

The basic idea of the invention is to make the sub-fields transitions smoother. This means that from a certain level the sub-field starts to be progressively used.

The invention relates to a method for encoding a video level of a pixel of a picture to be displayed by a display device into a code word called subfield code word, a weight being associated with each bit of the subfield code word, each bit having a state "ON" or "OFF" and causing light emission during an own period, called subfield, of a video frame when its state is "ON", the duration of the light emission period for said bit being proportional to the weight associated with said bit, wherein at least two bits of the subfield code word are computed recursively one after the other from the bit having the most significant weight to the bit having the least significant weight. According to the invention, for determining the state of at least one bit of said at least two bits of subfield code word, the method comprises the steps of

- associating a first threshold and a second threshold for said bit, said second threshold being greater than said first threshold,
- comparing the video level to be encoded by said bit and the following bits of the subfield code word to the first and second thresholds and:
  - if said video level is equal to or lower than the first threshold, allocating a state "OFF" to said bit,
  - if said video level is equal to or greater than the second threshold, allocating a state "ON" to said bit,
  - if said video level is lying between said first threshold and said second threshold, allocating a state "ON" or "OFF" to said bit according to a predetermined criteria.

Preferably, according to a given predetermined criteria, the probability to allocate a state "ON" to said bit is equal to the relative distance between the video level to be encoded by said bit and the following bits of the subfield code word and the first threshold associated with said bit.

In a first embodiment, the video level to be encoded by said bit and the followings bits of the sub-field code word for a current pixel of the picture to be displayed is equal to the video level to be encoded for said current pixel minus the video level already encoded by the preceding bits of said sub-field code word.

In a second embodiment, the video level to be encoded by said bit, called current bit, and the followings bits of the sub-field code word for a current pixel of the picture to be displayed is determined by the steps of:

- calculating, in the line of pixels to which the current pixel belongs, the number of pixels having the bit preceding said current bit, called preceding bit, in a "ON" state;

estimating a video level encoded by said preceding bit on the basis of said number of pixels, and subtracting said video level encoded by said preceding bit from the video level to be encoded by the preceding bit and its following bits of the subfield code word.

Since the computation of the sub-field code word is carried out from the bit having the most significant weight to the bit having the least significant weight, the preceding bits designate the bits having a more significant weight than the current bit and the following bits designate the bits having a less significant weight than the current bit.

The invention concerns also a device for implementing this method. For determining the state of a current bit of said subfield code word, this device comprises a dithering block for applying a dithering function to the video level to be encoded by said current bit and the following bits of the subfield code word on the basis of the difference between the second threshold and the first threshold, and a first comparator circuit for comparing the dithered video level to the second threshold and allocating a state ON to said bit when said dithered video level is equal to or greater than the second threshold.

To compute the video level to be encoded by the bits of the subfield code word following the current bit in accordance with the method of the first embodiment, the device further comprises a first subtraction circuit to subtract the first threshold from the video level to be encoded by the current bit and the following bits of the subfield code word;

a second comparator circuit for comparing the video level outputted by the first subtraction circuit to zero and outputting the higher video level, a third comparator circuit for comparing the video level outputted by the second comparator circuit to the difference between the second threshold and the first threshold and outputting the lower value, a first multiplication circuit for multiplying a fixed part value associated with the subfield of the current bit to the bit outputted by the first comparator circuit and outputting said fixed part value if the state of said bit is ON and zero if the state of said bit is OFF, an adder circuit for adding the value outputted by the third comparator circuit to the video level outputted by the first multiplication circuit, and a second subtraction circuit for subtracting the value outputted by the adder circuit from the video level to be encoded by the current bit and the following bits of the subfield code word, the result value being the video level to be encoded by the following bits of the subfield code word.

To compute the video level to be encoded by the bits of the subfield code word following the current bit in accordance with the method of the second embodiment, the device further comprises a first line memory for delaying the video level to be encoded by the current bit and the following bits of one line period;

a first subtraction circuit (101$_i$) to subtract the first threshold from the video level delayed by the first line memory, a second comparator circuit for comparing the video level outputted by the first subtraction circuit to zero and outputting the higher video level, a third comparator circuit for comparing the video level outputted by the second comparator circuit to the difference between the second threshold and the first threshold and outputting the lower value, a load evaluation circuit for computing, for the subfield associated with the current bit, the load of the line of pixels to which the current pixel belongs, a luminance gain estimation circuit for estimating a luminance gain ($L_i$) of the subfield associated with the current bit for said line of pixels on the basis on the load of said line of pixels, a second line memory for delaying of one line period the current bit outputted by the first comparator circuit, a first multiplication circuit for multiplying a fixed part value associated with the subfield of the current bit to the bit delayed by the second line memory and outputting said fixed part value if the state of said delayed current bit is ON and zero if the state of said delayed current bit is OFF, an adder circuit (107$_i$) for adding the value outputted by the third comparator circuit to the video level outputted by the first multiplication circuit, a second multiplication circuit for multiplying the video level outputted by the adder circuit to the luminance gain outputted by the luminance gain estimation circuit, and a second subtraction circuit for subtracting the value outputted by the second multiplication circuit from the video level delayed by the first line memory, the result value being the video level to be encoded by the following bits of the subfield code word.

BRIEF DESCRIPTION OF THE DRAWINGS

Exemplary embodiments of the invention are illustrated in the drawings and are explained in more detail in the following description. In the drawings.

DESCRIPTION OF PREFERRED EMBODIMENTS

The basic idea of the invention is to make the sub-fields transitions smoother. This means that, from a certain level, the sub-field starts to be used progressively.

This is made possible by the help of specific sub-fields called adaptive sub-fields; the weight of each sub-field is split into two components: a fixed part and an adaptive part, the sum of the fixed part and the adaptive part being equal to the sub-field weight. For the adaptive part, soft switches are introduced, which are based on a dithering scheme. Two switching values, one low switching value and one high switching value, are defined for each sub-field. These values are thresholds which define a soft switch. The low switching value is a threshold from which the sub-field starts to be partly used (i.e. all video levels smaller than this threshold do not use the corresponding sub-field at all) while the high switching value is a threshold from which the sub-field is fully used (i.e. all video levels bigger than this threshold use the corresponding sub-field). With this concept, the bigger the adaptive parts are, the less visible the contour noise are.

The invention will be now described for a 10 sub-fields coding using the following weights:

| | SF 1 | SF 2 | SF 3 | SF 4 | SF 5 | SF 6 | SF 7 | SF 8 | SF 9 | SF 10 |
|---|---|---|---|---|---|---|---|---|---|---|
| SF Weight | 1 | 2 | 4 | 7 | 12 | 19 | 29 | 42 | 59 | 80 |

For these subfields, the maximal value of the adaptive part, the fixed part, the low switching value and the high switching value can be defined as follows:

| | SF 1 | SF 2 | SF 3 | SF 4 | SF 5 | SF 6 | SF 7 | SF 8 | SF 9 | SF 10 |
|---|---|---|---|---|---|---|---|---|---|---|
| SF Weight | 1 | 2 | 4 | 7 | 12 | 19 | 29 | 42 | 59 | 80 |
| Adaptive/fixed part | 1/0 | 2/0 | 2/2 | 3/4 | 4/8 | 5/14 | 6/23 | 8/34 | 10/49 | 14/66 |
| Low Switching value | 0 | 1 | 3 | 7 | 14 | 26 | 45 | 74 | 116 | 175 |
| High Switching value | 1 | 3 | 5 | 10 | 18 | 31 | 51 | 82 | 126 | 189 |

The adaptive part indicated in this table is the maximum value of the adaptive part that can be used. The adaptive part has a variable size depending on the video level to be encoded and goes from 0 to the maximum value indicated in this table. Each adaptive part is computed recursively from the most significant sub-field (SF10) to the least significant sub-field (SF1). The maximal adaptive part is equal to the difference between the high switching value and the low switching value.

Figure 4:
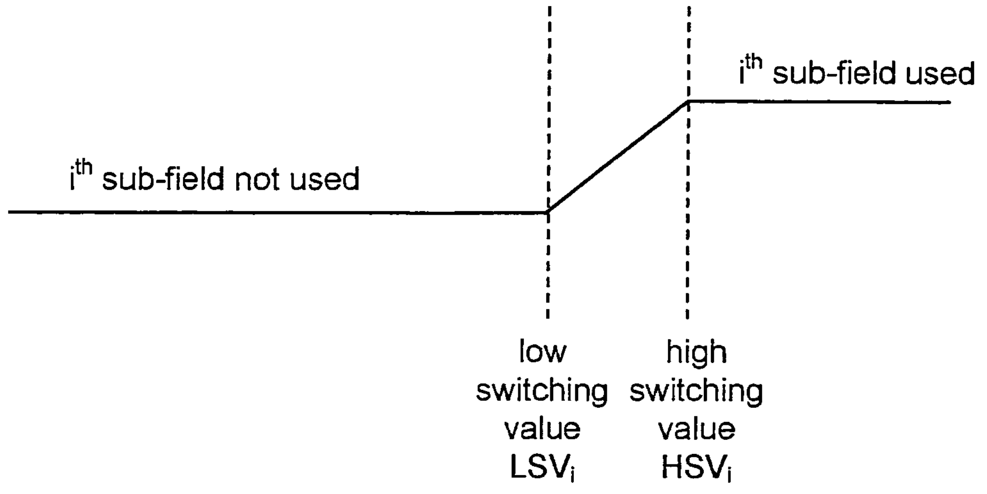
FIG. 4 illustrates the use of a low switching value (first threshold) and a high switching value (second threshold) for determining the state to be allocated to a bit associated with a given sub-field.

The idea of the invention is illustrated by FIG. 4 showing the mechanism of soft switching for the $i^{th}$ sub-field:

- if the video level to be encoded is lower than the low switching value (first threshold value) defined for the $i^{th}$ sub-field, then this sub-field is not used,
- if the video level to be encoded is greater than the high switching value (second threshold value) defined for said sub-field, then this sub-field is used,
- if the video level to be encoded is lying between the low switching value and the high switching value, the mechanism is different.

In this latter case (video level between the low and the high switching values), the probability of switching the sub-field on is selected as equal to the relative distance of the video level to the low switching value. This means that this probability is nil if the video level is equal to the low switching value and that this probability is maximal (i.e. equal to 1) if the video level is equal to the high switching value. This probability is equal to ½ for the mean value of the switching values. The probability of switching on the sub-field is rendered by dithering. This means that every sub-field can use dithering but these dithering functions should preferably not be correlated in order to reduce the dithering visibility. So if a pattern dithering is foreseen, only the most significant used sub-field should advantageously use it. The other sub-fields should advantageously use random dithering.

Thus, according to the invention, for a given sub-field, if the video level to be encoded is smaller than the low switching value, then the adaptive part is equal to 0. If the video level to be encoded is greater than the high switching value, then the adaptive part is equal to the adaptive part value indicated in the previous table. In the other cases, the adaptive part is equal to the difference between the video level to be encoded and the low switching value.

First Embodiment

The invention and the mechanism of adaptive sub-fields will be now described by a first basic encoding example. In this example, we want to encode the first line of the picture of FIG. 2: a white cross on a black background.

Figure 1:
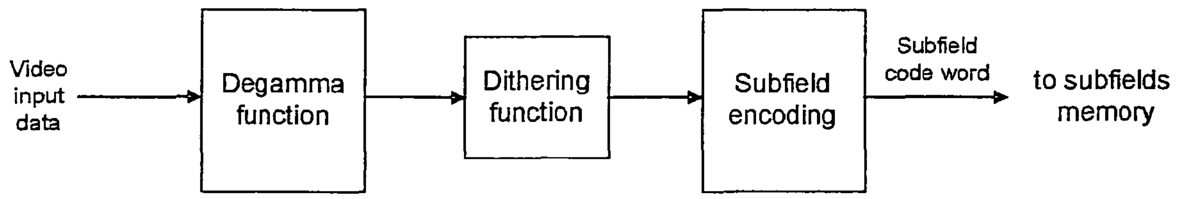
FIG.1 (PRIOR ART)
FIG. 1 is a classical schematic diagram showing the steps to be applied to video information of pixels to convert them into subfield code words.
Figure 2:
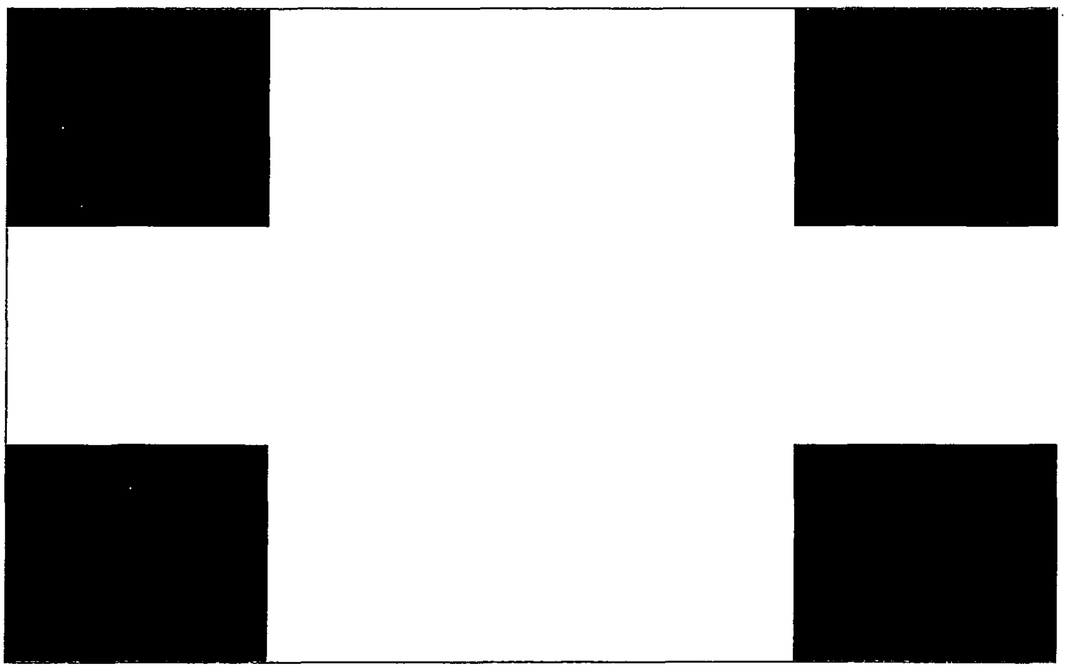
FIG. 2 is a test picture to be displayed by a display panel classically used to show line load effect.
Figure 3:
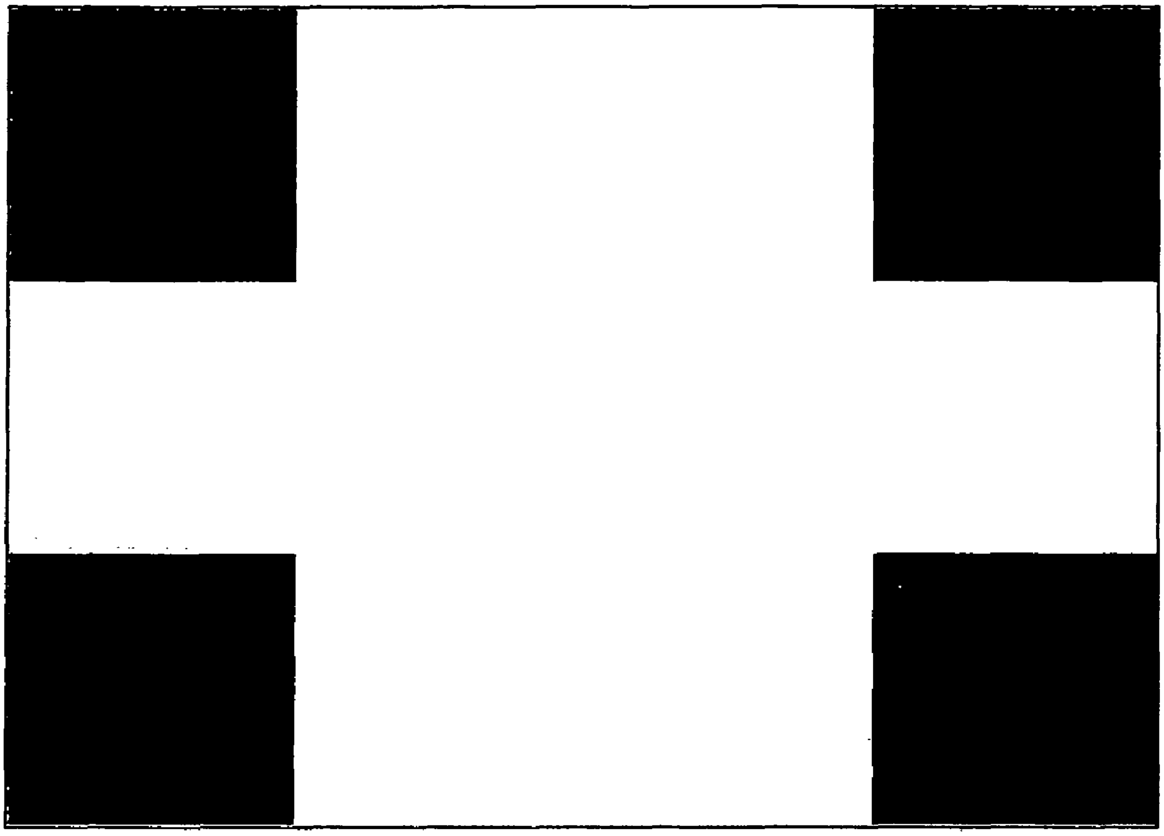
FIG. 3 shows the line load effect for the test picture of FIG. 2.

In FIG. 2, the black areas have a video level equal to 0, while the white areas (the cross) have a video level equal to 200. The use of the adaptive parts is not visible with a video level of 255 (all adaptive parts are used for this video level) for the white areas contrary to a video level of 200. That is a reason why the video level of 200 is used. In this first example, it will be considered that the luminance of each sub-field is only proportional to its weight (and not dependent on a line load as it will be described in the second example).

A video level of 200 is to be encoded for the white pixels of the cross. This video level is encoded recursively from the last sub-field to the first sub-field. So, we start by the last sub-field which is the $10^{th}$ sub-field.

First Recursive Step:

Since 200≧189 (189 is the high switching value of the $10^{th}$ sub-field), the white pixels use the $10^{th}$ sub-field and are encoded in X X X X X X X X X 1. X designates a bit not yet defined for the corresponding sub-field. 1 means that the corresponding sub-field is used (the cell emits light during this sub-field) and 0 means that the corresponding sub-field is not used. The adaptive part for the white pixels is equal to 14 because the video level to be encoded is greater than the high switching value. So the remaining video level to be encoded is equal to 200−14−66=120.

Second Recursive Step:

Since 116<120<126 (120 is lying in the soft switching part of the $9^{th}$ sub-field), a part of the white pixels uses the $9^{th}$ sub-field, while another part do not use it. So from now, two types of pixels have to be distinguished (more exactly, it should have been cells instead of pixels but it is simpler to use the word pixels): pixels A which uses the considered sub-field and pixels B that do not use it. The partition between pixels A and B is made by dithering. Since this is the first sub-field for which these pixels use dithering, this dithering can be a pattern dithering as mentioned before.

So 4 pixels over 10 white pixels $$\left(=\frac{120-116}{126-116}\right)$$

use this sub-field and 6 over 10 do not use it. This means that only 2 pixels over 10 use the 9$^{th}$ sub-field on the first line since only one half of the pixels are white pixels.

So 40% of white pixels (pixels A) are encoded in X X X X X X X X 1 1 and 60% of white pixels (pixels B) are encoded in X X X X X X X X 0 1.

The adaptive part of the white pixels (A and B) is equal to the difference between the video level to be encoded 120 and the low switching value; i.e. 4 (=120−116). So the remaining video level to be encoded for the pixels A is equal to 120−4−49=67 and the remaining video level to be encoded for the pixels B is equal to 120−4=116.

Third Recursive Step:

Pixels A:

Since 67≦74 (74 is the low switching value of the 8$^{th}$ sub-field), the pixels A do not use the 8$^{th}$ sub-field and are encoded in X X X X X X X 0 1 1. The adaptive part of these pixels is equal to zero and so the remaining video level to be encoded is still equal to 67.

Pixels B:

Since 116≧82 (82 is the high switching value of the 8$^{th}$ sub-field), the pixels B use the 8$^{th}$ sub-field and are encoded in X X X X X X X 1 0 1. The adaptive part for these pixels is equal to 8 and the remaining video level to be encoded for the pixels B is equal to 116−8−34=74. The repartition of the white pixels is always 40% pixels A, 60% pixels B.

Fourth Recursive Step:

Pixels A:

Since 67≧51 (51 is the high switching value of the 7$^{th}$ sub-field), the pixels A use the 7$^{th}$ sub-field and are encoded in X X X X X X 1 0 1 1. The adaptive part for these pixels is equal to 6 and the remaining video level to be encoded for the pixels A is equal to 67−6−23=38.

Pixels B:

Since 74≧51 (51 is the high switching value of the 7$^{th}$ sub-field), the pixels A use the 7$^{th}$ sub-field and are encoded in X X X X X X 1 1 0 1. The adaptive part for these pixels is equal to 6 and the remaining video level to be encoded for the pixels B is equal to 74−6−23=45.

Fifth Recursive Step:

Pixels A:

Since 38≧31 (=the high switching value of the 6$^{th}$ sub-field), the pixels A use the 6$^{th}$ sub-field, and so are encoded in X X X X X 1 1 0 1 1. The adaptive part is equal to 5 for these pixels, and so the video level to be encoded is equal to 38−5−14=19.

Pixels B:

Since 45≧31 (31 is the high switching value of the 6$^{th}$ sub-field), the pixels B use the 6$^{th}$ sub-field and are encoded in X X X X X 1 1 1 0 1. The adaptive part for these pixels is equal to 5 and the remaining video level to be encoded for the pixels B is equal to 45−5−14=26.

Sixth Recursive Step:

Pixels A:

Since 19≧18 (18 is the high switching value of the 5$^{th}$ sub-field), the pixels A use the 5$^{th}$ sub-field and are encoded in X X X X 1 1 1 0 1 1. The adaptive part of these pixels is equal to 4 and the remaining video level to be encoded for the pixels A is equal to 19−4−8=7.

Pixels B:

Since 26≧18 (18 is the high switching value of the 5$^{th}$ sub-field), the pixels B use the 5$^{th}$ sub-field and are encoded in X X X X 1 1 1 1 0 1. The adaptive part is equal to 4 for these pixels and the remaining video level to be encoded for the pixels A is equal to 26−4−8=14.

Seventh Recursive Step:

Pixels A:

Since 7≦7 (7 is the low switching value of the 4$^{th}$ sub-field), the pixels A do not use the 5$^{th}$ sub-field and are encoded in X X X 0 1 1 1 0 1 1, and the remaining video level to be encoded is still equal to 7.

Pixels B:

Since 14≧10 (10 is the high switching value of the 4$^{th}$ sub-field), the pixels B use the 4$^{th}$ sub-field and are encoded in X X X 1 1 1 1 1 0 1. The adaptive part is equal to 3 for these pixels and the remaining video level to be encoded for the pixels B is equal to 14−3−4=7.

Eighth Recursive Step:

Since 7≧5 (5 is the high switching value of the 3$^{rd}$ sub-field), all the white pixels use the 3$^{rd}$ sub-field and the pixels A are encoded in X X 1 0 1 1 1 0 1 1 while the pixels B are encoded in X X 1 1 1 1 1 1 0 1. The adaptive part is equal to 2 for all the white pixels and the remaining video level to be encoded is equal to 7−2−2=3.

Ninth Recursive Step:

Since 3≧3 (3 is the high switching value of the 2$^{nd}$ sub-field), all the white pixels use the 2$^{nd}$ sub-field and the pixels A are encoded in X 1 1 0 1 1 1 0 1 1 while the pixels B are encoded in X 1 1 1 1 1 1 1 0 1. The adaptive part is equal to 2 for all the white pixels and the remaining video level to be encoded is equal to 3−2−0=1.

Tenth and Last Recursive Step:

Since 1≧1 (1 is the high switching value of the 1$^{st}$ sub-field), all the white pixels use the 1$^{st}$ sub-field and the pixels A are encoded in 1 1 1 0 1 1 1 0 1 1 while the pixels B are encoded in 1 1 1 1 1 1 1 1 0 1.

So finally 40% of the white pixels (pixels A) are encoded in 1 1 1 0 1 1 1 0 1 1, and 60% of white pixels (pixels B) are encoded in 1 1 1 1 1 1 1 1 0 1. The pixels A have a luminance equal to 1+2+4+12+19+29+59+80=206 and the pixels B a luminance equal to 1+2+4+7+12+19+29+42+80=196. And so in average (for the white pixels), the level is equal to 40%*206+60%*196=200, which is exactly the video level to be rendered.

Second Embodiment

Some non-uniformities can be apparent due to a phenomenon called “line load effect”. Indeed, the luminance of a subfield can vary depending on the load of the line of pixels to be displayed. The load of a line is the number of pixels in a “ON” state in this line of pixels. So it is evaluated as soon as all required information is known. For example, it can be evaluated at the end of the loading of the picture in a memory of the display device but, in order to limit the time delay, it usually will be evaluated after each line. For a perfect display device where the luminance of a sub-field on a pixel is only a function of the pixel itself (display device without line load effect), the luminance of the pixel can be evaluated directly since the luminance of a sub-field is roughly the same for all pixels of the picture. For a display device where the luminance on a line is dependent on the load distribution on this line (e.g. line load effect), the luminance of a sub-field can only be evaluated when the sub-field has been encoded for the whole line. The line load effect can be seen as a luminance loss on a line. Nevertheless it is equivalent to say that when a sub-field is used on a whole line its luminance is decreased by n % in comparison to its luminance on a line where it is not used and to say that when the sub-field is not used on a line its luminance is increased by $$\frac{100}{100-n}\%$$

compared to its luminance when it is used on the whole line. The reference luminance is different, but the effect is the same. For example, it is equivalent when a sub-field is used on a whole line its luminance is decreased by 20% in comparison to its luminance on a line where it is not used and to say that when the sub-field is not used on a line its luminance is increased by 25% compared to its luminance when it is used on the whole line. Thus, in the FIG. 2, if we consider a luminance decrease of 20% due to line load effect, we can say that the video level of the white pixels of the first and last lines is 200·(1+(1−½)×0.25)=225 while the white pixels of the middle lines have a luminance of 200·(1+(1−1)×0.25)=200. So we can say that a luminance gain equal to (1+(1−½)×0.25)=0.125 is applied to the white pixels of the first and last lines while a gain luminance of 1 is applied to the white pixels of the middle lines.

In a second encoding example, the same picture (FIG. 2) is used: a white cross on a black background (FIG. 2). In this example, it will be considered that the target display device has a line load problem (which is linear and uniform on a line and on the whole panel): when a sub-field is used on a whole line, its luminance is decreased by 20% compared to its luminance on a line where it is not used. For this example, the black areas of FIG. 2 have a video level equal to 0 while the white area is defined as 210.

So on the first line, the level 210 has to be encoded for the white pixels.

First Line, First Recursive Step:

Since 210≧189 (189 is the high switching value of the 10$^{th}$ sub-field), the white pixels use the 10$^{th}$ sub-field and are encoded in X X X X X X X X X 1. The adaptive part for the white pixels is equal to 14. The load of this sub-field on this line is equal to ½. So the luminance of the adaptive part is equal to 14·(1+(1−½)×0.25)=15.75 and the luminance of the fixed part is equal to 66·(1+(1−½)×0.25)=74.25. So the remaining video level to be encoded is equal to 210−15.75−74.25=120.

First Line, Second Recursive Step:

Since 116<120<126 (120 is lying in the soft switching part of the 9$^{th}$ sub-field), a part of the white pixels use the 9$^{th}$ sub-field while another part do not use it. So we have to distinguish the pixels which use it (pixels A) and the others (pixels B). The partition between pixels A and B is made by dithering. Since this is the first sub-field for which these pixels use dithering, this dithering can be a pattern dithering.

So 4 pixels over 10 white pixels $$\left(=\frac{120-116}{126-116}\right)$$

use this sub-field and 6 over 10 do not use it. This means that only 2 pixels over 10 use the 9$^{th}$ sub-field on the first line since only one half of the pixels are white pixels.

So 40% of white pixels (pixels A) are encoded in X X X X X X X X 1 1 and 60% of white pixels (pixels B) are encoded in X X X X X X X X 0 1.

The adaptive part of the white pixels (A and B) is equal to 4 (=120−116). The load of the 9th sub-field is equal to 20% (since only the pixels A use it). And so the luminance of the adaptive part for the white pixels is equal to 4·(1+(1−0.2)×0.25)=4.8, and the luminance of the fixed part is equal to 49·(1+(1−0.2)×0.25)=58.8. So the remaining video level to be encoded for the pixels A is equal to 120−4.8−58.8=56.4 and the remaining video level to be encoded for the pixels B is equal to 120−4.8=115.2.

First Line, Third Recursive Step:

Pixels A:

Since 56.4<74 (74 is the low switching value of the 8$^{th}$ sub-field), the pixels A do not use the 8$^{th}$ sub-field and are encoded in X X X X X X X 0 1 1. The adaptive part of these pixels is equal to zero and the remaining video level to be encoded is still equal to 56.4.

Pixels B:

Since 115.2≧82 (82 is the high switching value of the 8$^{th}$ sub-field), the pixels B use the 8$^{th}$ sub-field and are encoded in X X X X X X X 1 0 1. The adaptive part for these pixels is equal to 8.

The load of the 8$^{th}$ sub-field is equal to 30% (since only the pixels B use it). So the luminance of the adaptive part of the pixels B is equal to 8·(1+(1−0.3)×0.25)=9.4 and the luminance of the fixed part is equal to 34·(1+(1−0.3)×0.25)=39.95.

So the remaining video level to be encoded for the pixels B is equal to 115.2−9.4−39.95=65.85 and the repartition on the first line is: 50% black pixels, 20% pixels A, 30% pixels B.

First Line, Fourth Recursive Step:

Pixels A:

Since 56.4≧51 (51 is the high switching value of the 7$^{th}$ sub-field), the pixels A use the 7$^{th}$ sub-field and are encoded in X X X X X X 1 0 1 1. The adaptive part for these pixels is equal to 6.

Pixels B:

Since 65.85≧51 (51 is the high switching value of the 7$^{th}$ sub-field), the pixels A use the 7$^{th}$ sub-field and are encoded in X X X X X X 1 1 0 1. The adaptive part for these pixels is equal to 6.

The load of the 7$^{th}$ sub-field is equal to ½ since all white pixels (A and B) use it. So the luminance of the adaptive part of the pixels A and B (which is in this case the same) is equal to 6·(1+(1−½)×0.25)=6.75 and the luminance of the fixed part is equal to 23·(1+(1−½)×0.25)=25.875.

So the remaining video level to be encoded for the pixels A is equal to 56.4−6.75−25.875=23.775 and for the pixels B 65.85−6.75−25.875=33.225.

First Line, Fifth Recursive Step:

Pixels A:

Since 23.775<26 (26 is the low switching value of the 6$^{th}$ sub-field), the pixels A do not use the 6$^{th}$ sub-field and are encoded in X X X X X 0 1 0 1 1. The adaptive part is equal to zero for these pixels and so the remaining video level to be encoded is still equal to 23.775.

Pixels B:

Since 33.225≧31 (31 is the high switching value of the 6$^{th}$ sub-field), the pixels B use the 6$^{th}$ sub-field and are encoded in X X X X X 1 1 1 0 1. The adaptive part for these pixels is equal to 5.

The load of the 6$^{th}$ sub-field is equal to 30% since only the pixels B use it. So the luminance of the adaptive part of the pixels B is equal to 5·(1+(1−0.3)×0.25)=5.875 and the luminance of the fixed part is equal to 14·(1+(1−0.3)×0.25)=16.45. So the remaining video level to be encoded for the pixels B is equal to 33.225−5.875−16.45=10.9.

First Line, Sixth Recursive Step:

Pixels A:

Since 23.775≧18 (18 is the high switching value of the 5$^{th}$ sub-field), the pixels A use the 5$^{th}$ sub-field and are encoded in X X X X 1 0 1 0 1 1. The adaptive part of these pixels is equal to 4.

Pixels B:

Since 10.9<14 (14 is the low switching value of the 5$^{th}$ sub-field), the pixels B do not use the 5$^{th}$ sub-field and are encoded in X X X X 0 1 1 1 0 1. The adaptive part is equal to zero for these pixels and so the remaining video level to be encoded is still equal to 10.9.

The load of the 5$^{th}$ sub-field is equal to 20% since only the pixels A use it. So the luminance of the adaptive part of the pixels A is equal to 4·(1+(1−0.2)×0.25)=4.8 and the luminance of the fixed part is equal to 8·(1+(1−0.2)×0.25)=9.6. So the remaining video level to be encoded for the pixels A is equal to 23.775−4.8−9.6=9.375.

First Line, Seventh Recursive Step:

Pixels A:

Since 7<9.375<10 (9.375 is lying between the switching values of the 4$^{th}$ sub-field), a part of the pixels A use the 4$^{th}$ sub-field while another part do not use it. So we have to distinguish the pixels A which use it (pixels A1) and the others (pixels A2). The partition between pixels A1 and A2 is made by dithering. But since these pixels have already used dithering on one sub-field (the 9$^{th}$), this dithering is advantageously not a pattern dithering but a random one (or error diffusion).

So 79.17% of the pixels A $$A\left(=\frac{9.375-7}{10-7}\right)$$

use the 4$^{th}$ sub-field and 20.83% do not use it. So the pixels A1 are encoded in X X X 1 1 0 1 0 1 1 and the pixels A2 in X X X 0 1 0 1 0 1 1.

The adaptive part of the pixels A (A1 and A2) is equal to 2.375 (=9.375−7).

Pixels B:

Since 10.9≧10 (10 is the high switching value of the 4$^{th}$ sub-field), all the pixels B use the 4$^{th}$ sub-field and are encoded in X X X 1 0 1 1 1 0 1. The adaptive part is equal to 3 for these pixels.

The load of the 4$^{th}$ sub-field is equal to 45.83% since 79.17% of pixels A use it (this means 79.17%*20%=15.83% of the whole line) and all pixels B (this means 30% of the whole line). So the luminance of the adaptive part of the pixels A (A1 and A2) is equal to 2.375·(1+(1−0.4583)×0.25)=2.697, the luminance of the adaptive part of the pixels B is equal to 3·(1+(1−0.4583)×0.25)=3.406 and the luminance of the fixed part is equal to 4·(1+(1−0.4583)×0.25)=4.542. So the remaining video level to be encoded for the pixels A1 is equal to 9.375−2.697−4.542=2.137, the remaining video level to be encoded for the pixels A2 is equal to 9.375−2.697=6.678 and the remaining video level to be encoded for the pixels B is equal to 10.9−3.406−4.542=2.952.

The repartition on the first line is: 50% black pixels, 15.83% pixels A1, 4.17% pixels A2 and 30% pixels B.

First Line, Eighth Recursive Step:

Pixels A1:

Since 2.137<3 (3 is the low switching value of the 3$^{rd}$ sub-field), the pixels A1 do not use the 3$^{rd}$ sub-field and are encoded in X X 0 1 1 0 1 0 1 1. The adaptive part is equal to zero for these pixels and the remaining video level to be encoded is still equal to 2.137.

Pixels A2:

Since 6.678≧5 (5 is the high switching value of the 3$^{rd}$ sub-field), the pixels A2 use the 3$^{rd}$ sub-field and are encoded in X X 1 0 1 0 1 0 1 1. The adaptive part is equal to 2 for these pixels.

Pixels B:

Since 2.952<3 (3 is the low switching value of the 3$^{rd}$ sub-field), the pixels B do not use the 3$^{rd}$ sub-field and are encoded in X X 0 1 0 1 1 1 0 1. The adaptive part is equal to zero for these pixels and so the remaining video level to be encoded is still equal to 2.952.

The load of the 3$^{rd}$ sub-field is equal to 4.17% since only the pixels A2 use it. So the luminance of the adaptive part of the pixels A2 is equal to 2·(1+(1−0.0417)×0.25)=2.479 and the luminance of the fixed part is equal to 2·(1+(1−0.0417)×0.25)=2.479. So the remaining video level to be encoded for the pixels A2 is equal to 6.678−2.479−2.479=1.72.

First Line, Ninth Recursive Step:

Pixels A1:

Since 1<2.137<3 (2.137 is lying between the switching values of the 2$^{nd}$ sub-field), a part of the pixels A1 use the 2$^{nd}$ sub-field while another part do not use it. So we have to distinguish the pixels A1 which use it (pixels A11) and the others (pixels A12). The partition between pixels A11 and A12 is made by dithering. But since these pixels have already used dithering on other sub-fields, this dithering is advantageously not a pattern dithering and is a random one (or error diffusion).

So 56.85% of the pixels A1

$$A1\left(=\frac{2.137-1}{3-1}\right)$$

use the 2$^{nd}$ sub-field and 43.15% do not use it. So the pixels A11 are encoded in X 1 0 1 1 0 1 0 1 1 and the pixels A12 in X 0 0 1 0 1 0 1 1.

The adaptive part of the pixels A1 (A11 and A12) is equal to 1.137 (=2.137−1).

Pixels A2:

Since 1<1.72<3 (1.72 is lying between the switching values of the 2$^{nd}$ sub-field), a part of the pixels A2 use the 2$^{nd}$ sub-field while another part do not use it. So we have to distinguish the pixels A2 which use it (pixels A21) and the others (pixels A22). The partition between pixels A21 and A22 is made by dithering. But since these pixels have already used dithering on other sub-fields, this dithering is advantageously not a pattern dithering but is a random one (or error diffusion).

So 36% of the pixels A2

$$A2\left(=\frac{1.72-1}{3-1}\right)$$

use the 2$^{nd}$ sub-field and 64% do not use it. So the pixels A21 are encoded in X 1 1 0 1 0 1 0 1 1 and the pixels A22 in X 0 1 0 1 0 0 1 1.

The adaptive part of the pixels A1 (A11 and A12) is equal to 0.72 (=1.72−1).

Pixels B:

Since 1<2.952<3 (2.952 is lying between the switching values of the 2$^{nd}$ sub-field), a part of the pixels B use the 2$^{nd}$ sub-field while another part do not use it. So we have to distinguish the pixels B which use it (pixels B1) and the others (pixels B2). The partition between pixels B1 and B2 is made by dithering. But since these pixels have already used dithering on other sub-fields, this dithering is advantageously not a pattern dithering but is a random one (or error diffusion).

$$B\left(=\frac{2.952-1}{3-1}\right)$$

So 97.6% of the pixels B use the 2nd sub-field and 2.4% do not use it. So the pixels B1 are encoded in X 1 0 1 0 1 1 1 0 1 and the pixels B2 in X 0 0 1 0 1 1 1 0 1.

The adaptive part of the pixels B (B1 and B2) is equal to 1.952 (=2.952−1). The repartition on the first line is: 50% black pixels, 9% pixels A11, 6.83% pixels A12, 1.5% pixels A21, 2.67% pixels A22, 29.28% pixels B1 and 0.72% pixels B2.

The load of the 2nd sub-field is equal to 39.78% since the pixels A11, A21 and B1 use it. So the luminance of the adaptive part of the pixels A1 is equal to 1.137·(1+(1−0.3978)×0.25)=1.308, the luminance of the adaptive part of the pixels A2 is equal to 0.72·(1+(1−0.3978)×0.25)=0.828, the luminance of the adaptive part of the pixels B is equal to 1.952·(1+(1−0.3978)×0.25)=2.246 and the luminance of the fixed part is equal to 0 (for this sub-field there is no fixed part). So the remaining video level to be encoded for the pixels A11 is equal to 2.137−1.308=0.829, for the pixels A12: 2.137−1.308=0.829, for the pixels A21: 1.72−0.828=0.892, for the pixels A22: 1.72−0.828=0.892, for the pixels B1: 2.952−2.246=0.706 and for the pixels B2: 2.952−2.246=0.706.

First Line, Tenth Recursive Step:

Since all the remaining video levels to be encoded for the white pixels are all comprised between the switching values of the first pixel (0 and 1), they all need to use dithering.

Pixels A11:

Since 0<0.829<1 (0.829 is lying between the switching values of the 1st sub-field), a part of the pixels A1 use the 1st sub-field while another part do not use it. So we have to distinguish the pixels A11 which use it (pixels A111) and the others (pixels A112). The partition between pixels A111 and A112 is made by dithering. But since these pixels have already used dithering on other sub-fields, this dithering is advantageously not a pattern dithering and is a random one (or error diffusion).

So 82.9% of the pixels A11

$$A11\left(=\frac{0.829-0}{1-0}\right)$$

use the 1st sub-field and 17.1% do not use it. So the pixels A111 are encoded in 1 1 0 1 1 0 1 0 1 1 and the pixels A112 in 0 1 0 1 1 0 1 0 1 1.

The adaptive part of the pixels A11 (A111 and A112) is equal to 0.829 (=0.829−0).

Pixels A12:

Since 0<0.829<1 (0.829 is lying between the switching values of the 1st sub-field), a part of the pixels A12 use the 1st sub-field while another part do not use it. So we have to distinguish the pixels A12 which use it (pixels A121) and the others (pixels A122). The partition between pixels A121 and A122 is made by dithering. But since these pixels have already used dithering on other sub-fields, this dithering is advantageously not a pattern dithering and is a random one (or error diffusion).

So 82.9% of the pixels A12

$$A12\left(=\frac{0.829-0}{1-0}\right)$$

use the 1st sub-field and 17.1% do not use it. So the pixels A121 are encoded in 1 0 0 1 1 0 1 0 1 1 and the pixels A122 in 0 0 0 1 1 0 1 0 1 1.

The adaptive part of the pixels A12 (A121 and A122) is equal to 0.829 (=0.829−0).

Pixels A21:

Since 0<0.892<1 (0.892 is lying between the switching values of the 1st sub-field), a part of the pixels A21 use the 1st sub-field while another part do not use it. So we have to distinguish the pixels A21 which use it (pixels A211) and the others (pixels A212). The partition between pixels A211 and A212 is made by dithering. But since these pixels have already used dithering on other sub-fields, this dithering is advantageously not a pattern dithering and is a random one (or error diffusion).

So 89.2% of the pixels $$A21\left(=\frac{0.892-0}{1-0}\right)$$

use the 1st sub-field and 10.8% do not use it. So the pixels A211 are encoded in 1 1 1 0 1 0 1 0 1 1 and the pixels A212 in 0 1 1 0 1 0 1 0 1 1.

The adaptive part of the pixels A21 (A211 and A212) is equal to 0.892 (=0.892−0).

Pixels A22:

Since 0<0.892<1 (0.892 is lying between the switching values of the 1st sub-field), a part of the pixels A22 use the 1st sub-field while another part do not use it. So we have to distinguish the pixels A22 which use it (pixels A221) and the others (pixels A222). The partition between pixels A221 and A222 is made by dithering. But since these pixels have already used dithering on other sub-fields, this dithering is advantageously not a pattern dithering and is a random one (or error diffusion).

So 89.2% of the pixels $$A22\left(=\frac{0.892-0}{1-0}\right)$$

use 1st sub-field and 10.8% do not use it. So the pixels A221 are encoded in 1 0 1 0 1 0 1 0 1 1 and the pixels A222 in 0 0 1 0 1 0 1 0 1 1.

The adaptive part of the pixels A22 (A221 and A222) is equal to 0.892 (=0.892−0).

Pixels B1:

Since 0<0.706<1 (0.706 is lying between the switching values of the 1st sub-field), a part of the pixels B1 use the 1st sub-field while another part do not use it. So we have to distinguish the pixels B1 which use it (pixels B11) and the others (pixels B12). The partition between pixels B11 and B12 is made by dithering. But since these pixels have already used dithering on other sub-fields, this dithering is advantageously not a pattern dithering and is a random one (or error diffusion).

So 70.6% of the pixels $$B1\left(=\frac{0.706-0}{1-0}\right)$$

use 1st sub-field and 29.4% do not use it. So the pixels B11 are encoded in 1 1 0 1 0 1 1 1 0 1 and the pixels B12 in 0 1 0 1 0 1 1 1 0 1.

The adaptive part of the pixels B1 (B11 and B12) is equal to 0.706 (=0.706−0).

Pixels B2:

Since 0<0.706<1 (0.706 is lying between the switching values of the 1st sub-field), a part of the pixels B2 use the 1st sub-field while another part do not use it. So we have to distinguish the pixels B2 which use it (pixels B21) and the others (pixels B22). The partition between pixels B21 and B22 is made by dithering. But since these pixels have already used dithering on other sub-fields, this dithering is advantageously not a pattern dithering and is a random one (or error diffusion).

So 70.6% of the pixels $$B2\left(=\frac{0.706-0}{1-0}\right)$$

use the 1st sub-field and 29.4% do not use it. So the pixels B21 are encoded in 1 0 0 1 0 1 1 1 0 1 and the pixels B22 in 0 0 0 1 0 1 1 1 0 1.

The adaptive part of the pixels B2 (B21 and B22) is equal to 0.706 (=0.706−0).

Finally we get the following pixels categories for the first line:

50% black pixels: 0 0 0 0 0 0 0 0 0 0
7.46% (=0.09×0.829) pixels A111: 1 1 0 1 1 0 1 0 1 1
1.54% (=0.09×0.171) pixels A112: 0 1 0 1 1 0 1 0 1 1
5.66% (=0.0683×0.829) pixels A121: 1 0 0 1 1 0 1 0 1 1
1.17% (=0.0683×0.171) pixels A122: 0 0 0 1 1 0 1 0 1 1
1.34% (=0.015×0.892) pixels A211: 1 1 1 0 1 0 1 0 1 1
0.16% (=0.015×0.108) pixels A212: 0 1 1 0 1 0 1 0 1 1
2.38% (=0.0267×0.892) pixels A221: 1 0 1 0 1 0 1 0 1 1
0.29% (=0.0267×0.108) pixels A222: 0 0 1 0 1 0 1 0 1 1
20.67% (=0.2928×0.706) pixels B11: 1 1 0 1 0 1 1 1 0 1
8.61% (=0.2928×0.294) pixels B12: 0 1 0 1 0 1 1 1 0 1
0.51% (=0.0072×0.706) pixels B21: 1 0 0 1 0 1 1 1 0 1
0.21% (=0.0072×0.294) pixels B22: 0 0 0 1 0 1 1 1 0 1

The load of the 1st sub-field is equal to 38.02% since the pixels A11, A121, A211, A221, B11 and B21 use it.

The luminance of each sub-field on the first line can be evaluated

10th sub-field: load of 50%, luminance: 90=80(1+(1−0.5)×0.25)
9th sub-field: load of 20%, luminance: 70.8=59(1+(1−0.2)×0.25)
8th sub-field: load of 30%, luminance: 49.35=42(1+(1−0.3)×0.25)
7th sub-field: load of 50%, luminance: 32.625=29(1+(1−0.5)×0.25)
6th sub-field: load of 30%, luminance: 22.325=19(1+(1−0.5)×0.25)
5th sub-field: load of 20%, luminance: 14.4=12(1+(1−0.2)×0.25)
4th sub-field: load of 45.83%, luminance: 7.948=7(1+(1−0.4583)×0.25)
3rd sub-field: load of 4.17%, luminance: 4.958=4(1+(1−0.0417)×0.25)
2nd sub-field: load of 39.78%, luminance: 2.3=2(1+(1−0.3978)×0.25)
1st sub-field: load of 38.02%, luminance: 1.155=1(1+(1−0.382)×0.25)

From these video levels, we can calculate back the luminance of each pixel category:

7.46% Pixels A111 (14.92% of the white pixel of the first line): 219.23
1.54% Pixels A112 (3.08% of the white pixel of the first line): 218.07
5.66% Pixels A121 (11.32% of the white pixel of the first line): 216.93
1.17% Pixels A122 (2.34% of the white pixel of the first line): 215.77
1.34% Pixels A211 (2.68% of the white pixel of the first line): 216.24
0.16% Pixels A212 (0.32% of the white pixel of the first line): 215.08
2.38% Pixels A221 (4.76% of the white pixel of the first line): 213.94
0.29% Pixels A222 (0.58% of the white pixel of the first line): 212.78
20.67% Pixels B11 (41.34% of the white pixel of the first line): 205.7
8.61% Pixels B12 (17.22% of the white pixel of the first line): 204.55
0.51% Pixels B21 (1.02% of the white pixel of the first line): 203.4
0.21% Pixels B22 (0.42% of the white pixel of the first line): 202.25

And so in average (for the white pixels), we get 210 for the white pixels on the first line.

On the middle line, without explaining in detail, 35.202% of the pixels (pixels A) are encoded in 1 1 0 1 1 1 1 0 1 1,
31.25% of the pixels (pixels B) are encoded in 1 0 1 1 1 1 1 0 1 1,
18.75% of the pixels (pixels C) are encoded in 0 0 1 1 1 1 1 0 1 1,
11.673% of the pixels (pixels D) are encoded in 0 1 0 1 1 1 1 0 1 1,
2.347% of the pixels (pixels E) are encoded in 1 0 0 1 1 1 1 0 1 1, and
0.778% of the pixels (pixels F) are encoded in 0 0 0 1 1 1 1 0 1 1.

So the load and the luminance of the sub-fields are:

10th sub-field: load of 100%, luminance: 80
9th sub-field: load of 100%, luminance: 59
8th sub-field: load of 0%, luminance: 52.5
7th sub-field: load of 100%, luminance: 29
6th sub-field: load of 100%, luminance: 19
5th sub-field: load of 100%, luminance: 12
4th sub-field: load of 100%, luminance: 7
3rd sub-field: load of 56%, luminance: 4.5
2nd sub-field: load of 46.875%, luminance: 2.26
1st sub-field: load of 68.8%, luminance: 1.08

This means that the pixels have the following luminance:

Pixel A: 209.34
Pixel B: 211.58
Pixel C: 210.5
Pixels D: 208.26
Pixels E: 209.34
Pixels F: 206

So in average, the pixels of middle line have a luminance equal to 210.

So the recursive coding process is still correct, and at the same time the false contour effect is reduced.

Figure 5:
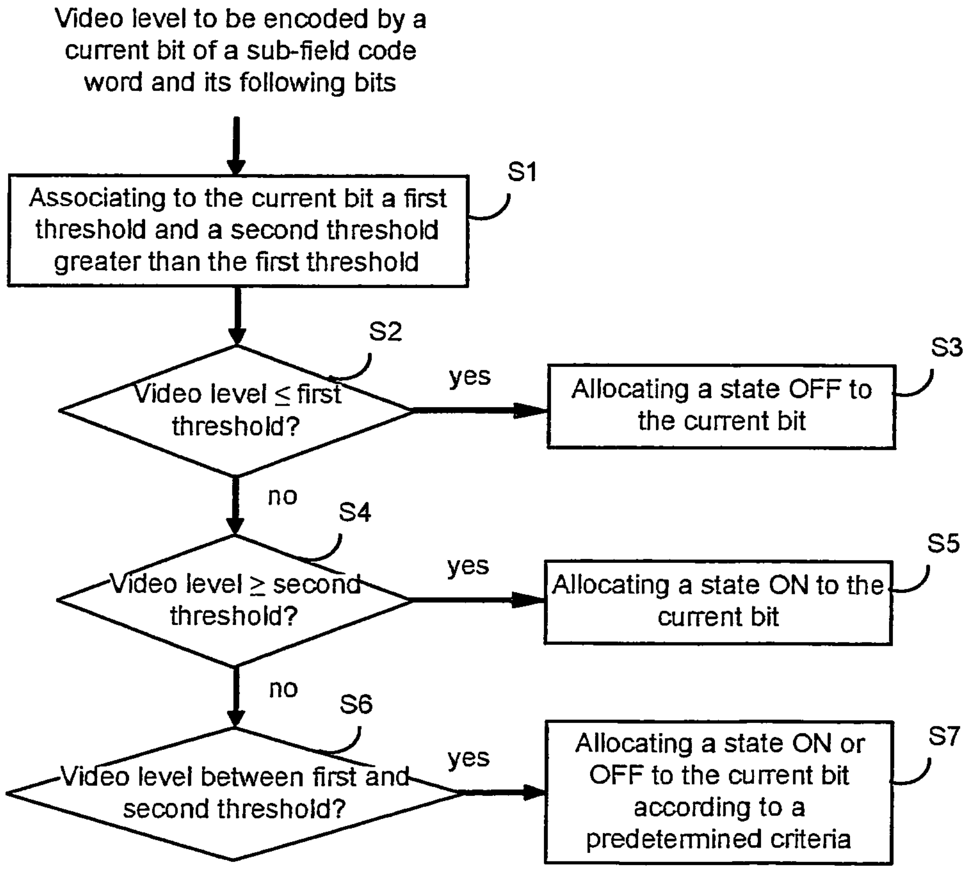
FIG. 5 is a block diagram showing the steps of the method according to the invention.

Finally, the method of the invention can be summarized as shown in FIG. 5. This figure is a block diagram of the steps of the invention. The bits of the subfield code word of a current pixel are computed recursively one after the other from the bit having the most significant weight to the bit having the least significant weight. For determining the state of a current bit of the subfield code word of a current pixel, it comprises the following steps. In a step S1, a first threshold and a second threshold are associated with this current bit. The first threshold corresponds to the low switching value and the second threshold corresponds to the high switching value. In steps S2, S4 and S6, the video level to be encoded by the current bit and the following bits is compared to these thresholds. If this video level is lower than or equal to the first threshold, a state OFF is allocated to the current bit (step S3). If this video level is greater than or equal to the second threshold, a state ON is allocated to the current bit (step S5). If this video level is lying between the first threshold and the second threshold, a state ON or OFF is allocated to the current bit according to a predetermined criteria (step S7). As described hereinabove by the two embodiments, according to the predetermined criteria, the probability to allocate a state "ON" to current bit is equal to the relative distance between the video level to be encoded by the current bit and the following bits and the first threshold associated with said bit. This probability is rendered by dithering.

Figure 6:
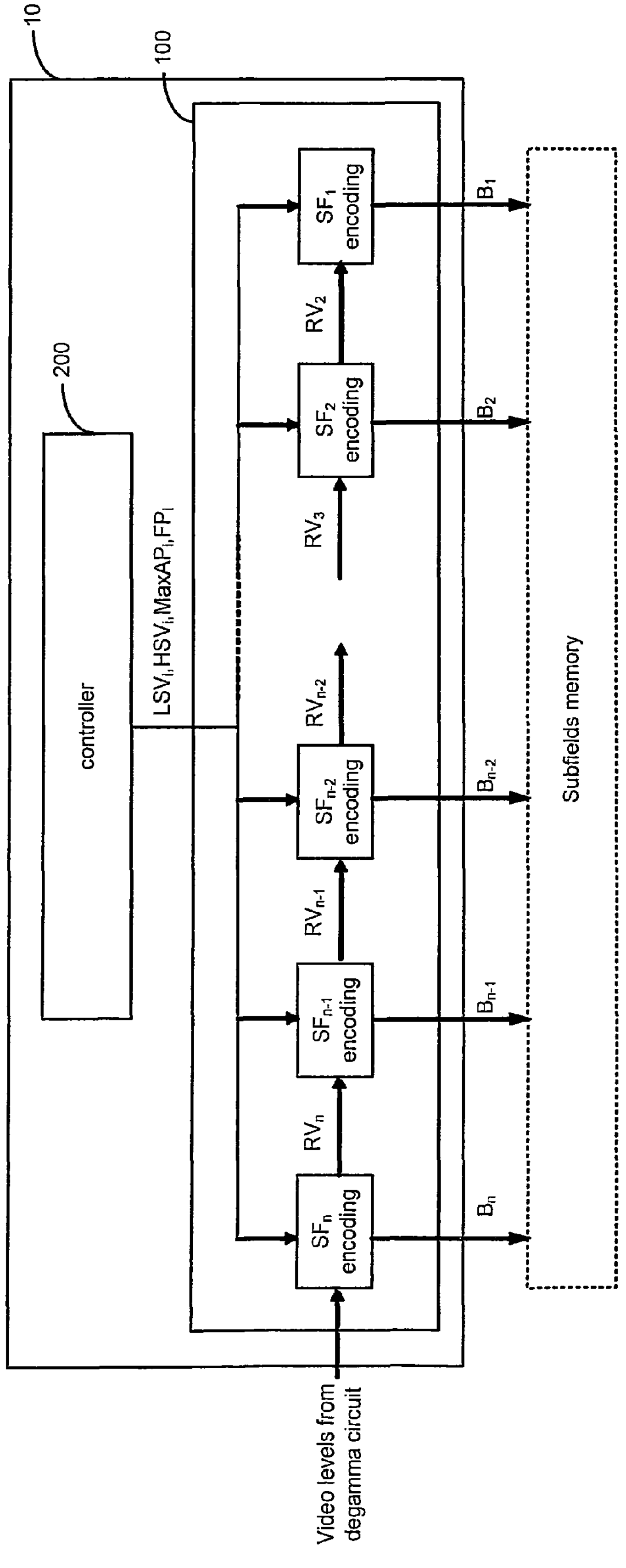
FIG. 6 is the block diagram of a device for generating a subfield code word, said device comprising a plurality of encoding blocks each generating a bit of the subfield code word, each encoding block implementing the method according to the invention.

A device 10 adapted for implementing the inventive method is proposed at FIG. 6. This device 10 comprises a recursive encoding circuit 100 and a controller 200 for controlling the circuit 100. The recursive encoding circuit 100 receives video coming from a degamma circuit and outputs subfield code words to a subfields memory.

The recursive encoding circuit 100 comprises n encoding blocks, one for each subfield (n being the number of subfield). Each encoding block generates a bit of the sub-field code word. In the following description, each subfield is denoted $SF_i$, i being the number of the subfield. $SF_n$ designates the subfield with the highest weight (also denoted most significant subfield) and $SF_1$ designates the subfield with the lowest weight (also denoted least significant subfield). Each encoding block receives from the controller 200 the high switching value denoted $HSV_i$ and the low switching value denoted $LSV_i$ both associated with the subfield $SF_i$, the fixed part $FP_i$ and the maximal adaptive part $MaxAP_i$ associated with the subfield $SF_i$ and a remaining video level $RV_i$ coming from the preceding encoding block or the degamma circuit and outputs a sub-field code bit $B_i$ corresponding to the bit of sub-field code word associated with the subfield $SF_i$. The bit $B_i$ is stored in the subfields memory.

More particularly, the encoding block associated with the subfield $SF_n$ receives a video level coming from the degamma circuit and the values $HSV_n$, $LSV_n$, $MaxAP_n$ and $FP_n$ associated with the subfield $SF_n$ from the controller 200 and outputs a subfield code bit $B_n$ and the remaining video level $RV_n$ to be encoded by the following encoding blocks. The encoding block associated with the subfield $SF_i$, i∈[2 . . . n−1] receives the remaining video level $RV_{i+1}$ and the values $HSV_i$, $LSV_i$, $MaxAP_i$ and $FP_i$ associated with the subfield $SF_i$ from the controller 101 and outputs the subfield code bit $B_i$ and the remaining video level $RV_i$ to be encoded by the following encoding blocks. The last encoding block associated with the subfield $SF_1$ receives the remaining video level $RV_2$ and the values $HSV_1$, $LSV_1$, $MaxAP_1$ and $FP_1$ and outputs the subfield code bit $B_1$.

Figure 7:
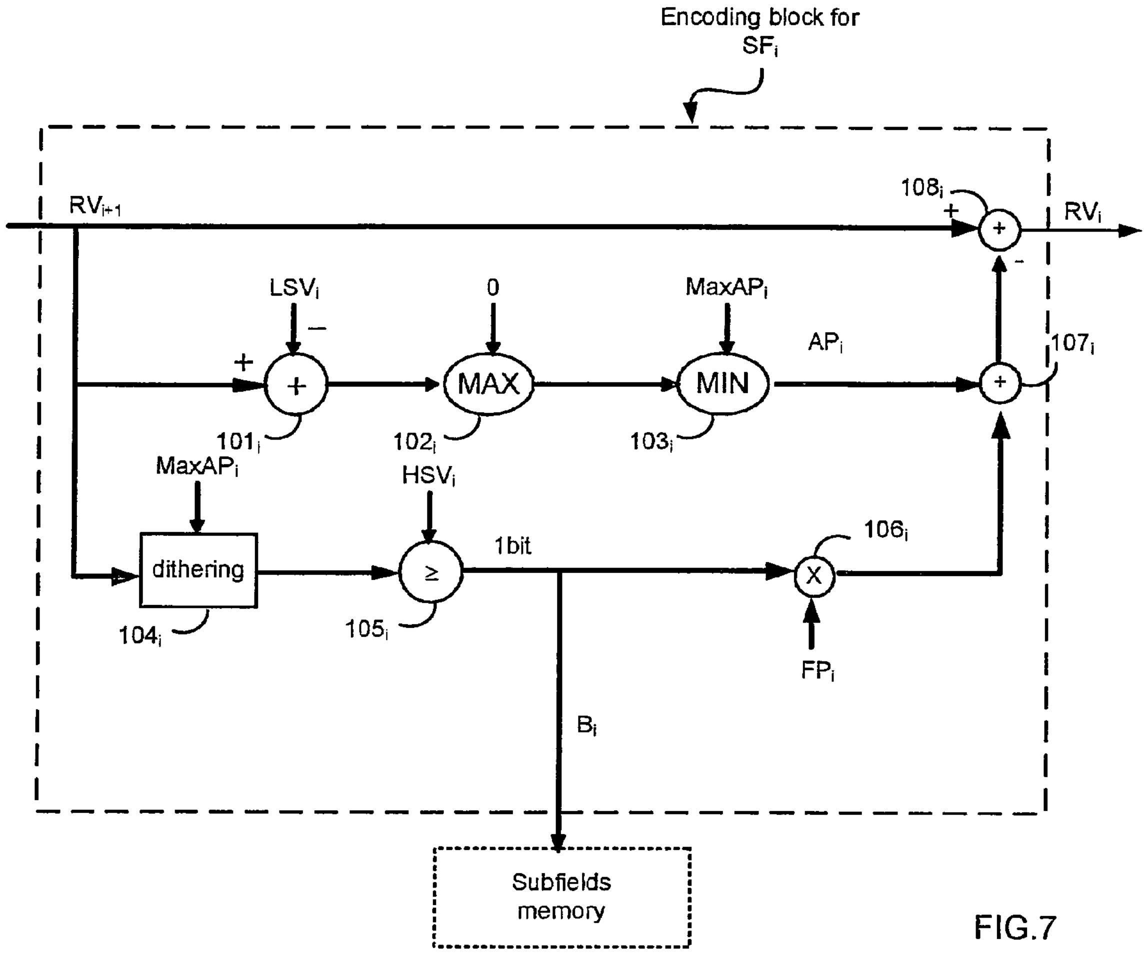
FIG. 7 is the block diagram of an encoding block of FIG. 6 according to a first embodiment of the invention, said encoding block being used for generating the bit associated with a subfield different from the least significant subfield.

A possible schematic diagram of the encoding block associated with the subfield $SF_i$, i∈[2 . . . n], is shown at FIG. 7. This block is designed for implementing the first embodiment. It comprises:

- a first subtraction circuit $\mathbf{101}_i$ to subtract the value $LSV_i$ from the video level coming from the degamma circuit for the subfield $SF_n$ or the remaining video levels $RV_i$ for the subfields $SF_i$ with i∈[2 . . . n−1];
- a first comparator circuit $\mathbf{102}_i$ for comparing the video level outputted by the subtraction circuit $\mathbf{101}_i$ to the value zero and outputting the higher one,
- a second comparator circuit $\mathbf{103}_i$ for comparing the video level outputted by the first comparator circuit $\mathbf{102}_i$ to the value $MaxAP_i$ and outputting the lower one, corresponding to the adaptive part $AP_i$,
- a dithering block $\mathbf{104}_i$ for applying a dithering function to said video levels or remaining levels $RV_i$ using as maximal adaptive part the value $MaxAP_i$,
- a third comparator circuit $\mathbf{105}_i$ for comparing the dithered video levels to the high switching value $HSV_i$ and outputting a bit $B_i$ to "1" when said dithered video levels are equal to or greater than $HSV_i$, the bit $B_i$ being the subfield code bit that is stored in the subfields memory,
- a first multiplication circuit $\mathbf{106}_i$ for multiplying the bit $B_i$ and the fixed part $FP_i$;

an adder circuit $\mathbf{107}_i$ for adding the adaptive part $AP_i$ outputted by the comparator circuit $\mathbf{103}_i$ to the video level outputted by the multiplication circuit $\mathbf{106}_i$, and

- a second subtraction circuit $\mathbf{108}_i$ for subtracting the output value of the adder circuit $\mathbf{107}_i$ from the video level $RV_{i+1}$, the result value being the remaining value to be encoded by the following encoding blocks.

Figure 8:
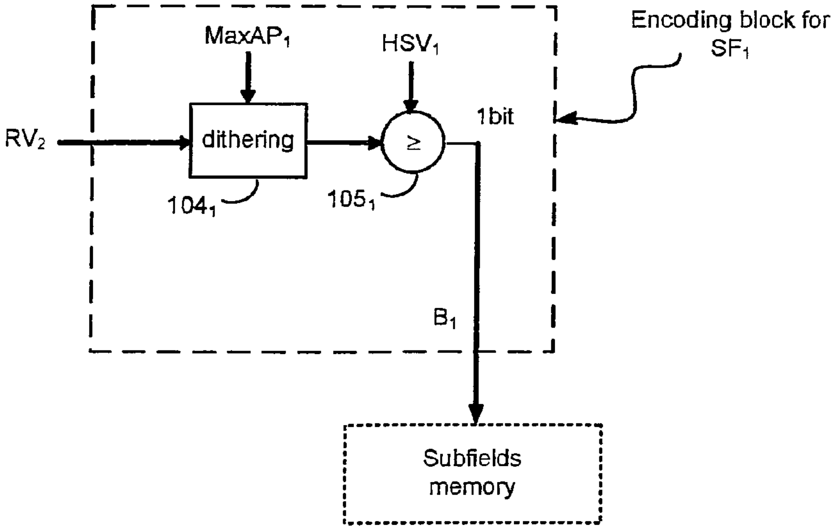
FIG. 8 is the block diagram of an encoding block of FIG. 6 according to a first embodiment of the invention, said encoding block being used for generating the bit associated with the least significant subfield.

The encoding block associated with the subfield $SF_1$ is little bit different from the other ones. A possible schematic diagram of this block is shown at FIG. 8. It only comprises:

- a dithering block $\mathbf{104}_1$ for applying a dithering function to remaining levels $RV_2$ using as maximal adaptive part the value $MaxAP_1$, and
- a comparator circuit $\mathbf{105}_1$ for comparing the dithered video levels to the high switching value $HSV_1$ and outputting a bit $B_1$ to "1" when said dithered video levels are equal to or greater than $HSV_1$; the bit $B_1$ is stored in the subfields memory.

Figure 9:
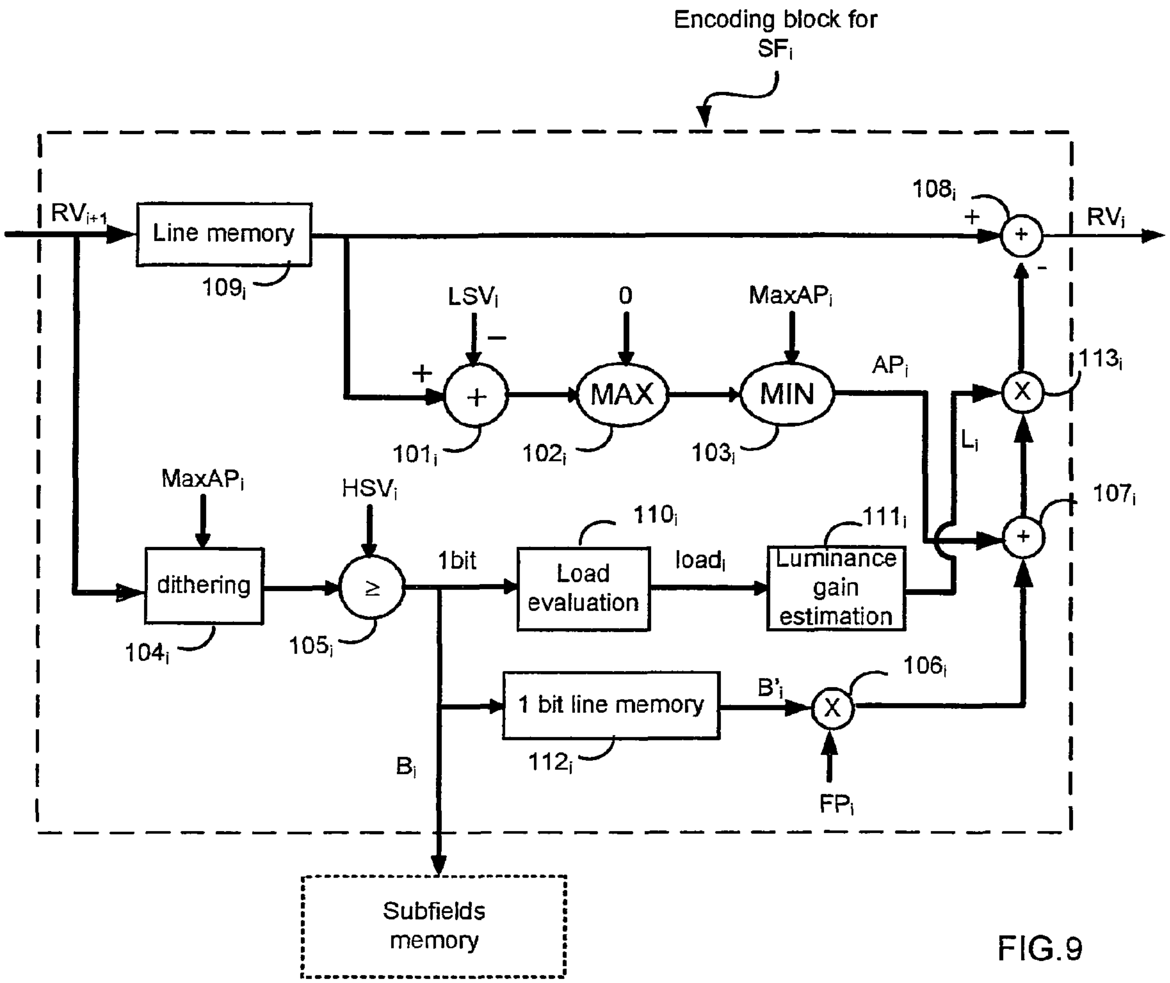
FIG. 9 is the block diagram of an encoding block of FIG. 6 according to a second embodiment of the invention.

For implementing the second embodiment of the invention, the block diagram of FIG. 7 is modified. This block is shown at FIG. 9. Like elements have like references. It comprises:

- a first line memory $\mathbf{109}_i$ for delaying of one line period the video levels for a line of pixels coming from the degamma circuit for the subfield $SF_n$ or the remaining video levels $RV_i$ for the subfields $SF_i$ with iδ[2 . . . n−1];
- a first subtraction circuit $\mathbf{101}_i$ to subtract the value $LSV_i$ from the video level $RV_i$, delayed by the line memory $\mathbf{109}_i$,
- a first comparator circuit $\mathbf{102}_i$ for comparing the video level outputted by the subtraction circuit $\mathbf{101}_i$ to the value zero and outputting the higher one,
- a second comparator circuit $\mathbf{103}_i$ for comparing the video level outputted by the first comparator circuit $\mathbf{102}_i$ to the value $MaxAP_i$ and outputting the lower one, corresponding to the adaptive part $AP_i$,
- a dithering block $\mathbf{104}_i$ for applying a dithering function to said video levels or remaining levels $RV_i$ using as maximal adaptive part the value $MaxAP_i$,
- a third comparator circuit $\mathbf{105}_i$ for comparing the dithered video levels to the high switching value $HSV_i$ and outputting a bit $B_i$ to "1" when said dithered video levels are equal to or greater than $HSV_i$, the bit $B_i$ being the subfield code bit that is stored in the subfields memory, a load evaluation circuit 111$_i$ for computing, for the subfield $SF_i$, the load $load_i$ of the line of pixels to which the current pixel belongs, a luminance gain estimation circuit 112$_i$ for estimating a luminance gain $L_i$ of the subfield $SF_i$ for the considered line of pixels on the basis on the load values $load_i$, a second line memory 113$_i$ for delaying the bit $B_i$ of one line period, said delayed bit be denoted $B'_i$, a first multiplication circuit 106$_i$ for multiplying the bit $B'_i$ and the fixed part $FP_i$;

an adder circuit 107$_i$ for adding the adaptive part $AP_i$ outputted by the second comparator 103$_i$ to the video level outputted by the multiplication circuit 106$_i$, a second multiplication circuit 114$_i$ for multiplying the video level outputted by the adder circuit 107$_i$ to the luminance gain $L_i$ of the subfield $SF_i$, and a second subtraction circuit 108$_i$ for subtracting the output value of the multiplying circuit 114$_i$ from the video level stored in the line memory 109$_i$, the result value being the remaining value to be encoded by the following encoding blocks.

The encoding block associated with the subfield $SF_1$ is identical to the block shown at FIG. 8.

The different line memories of the device can be combined in one single memory. Some of these separate circuits can also be grouped together. Furthermore the recursive coding can be applied for coding only significant bits of the sub-field code word. That means that the embodiments described here are specified as examples and a person skilled in the art can realize other embodiments of the invention which remain within the scope of the invention as specified in the appended claims.

The invention claimed is:

1. Method for encoding a video level of a pixel of a picture to be displayed by a display device into a code word called subfield code word, a weight being associated with each bit of the subfield code word, each bit having a state "ON" or "OFF" and causing light emission during an own period, called sub-field, of a video frame when its state is "ON", the duration of the light emission period for said bit being proportional to the weight associated with said bit and wherein bits of the sub-field code word are computed recursively one after the other from the bit having the most significant weight to the bit having the least significant weight, characterized in that, for determining the state of a bit of said subfield code word, it comprises the steps of associating (S1) a first threshold and a second threshold with said bit, said second threshold being greater than said first threshold, comparing the video level to be encoded by said bit and the following bits of the subfield code word to the first and second thresholds and:

if said video level is equal to or lower than the first threshold (S2), allocating (S3) a state "OFF" to said bit, if said video level is equal to or greater than the second threshold (S4), allocating (S5) a state "ON" to said bit, if said video level is lying between said first threshold and said second threshold (S6), allocating (S7) a state "ON" or "OFF" to said bit according to a predetermined criteria.

2. Method according to claim 1, wherein, according to a predetermined criteria, the probability to allocate a state "ON" to said bit is equal to the relative distance between the video level to be encoded by said bit and the following bits and the first threshold associated with said bit.

3. Method according to claim 2, wherein dithering is used to render said probability.

4. Method according to claim 3, wherein the dithering is different for at least two bits of the sub-field code word.

5. Method according to claim 1, wherein the video level to be encoded by said bit and the followings bits of the sub-field code word for a current pixel of the picture to be displayed is equal to the video level to be encoded for said current pixel minus the video level encoded by the already computed bits of said sub-field code word.

6. Method according to claim 1, wherein the video level to be encoded by said bit, called current bit, and the followings bits of the sub-field code word for a current pixel of the picture to be displayed is determined by the steps of:

calculating, in the line of pixels to which the current pixel belongs, the number of pixels having the bit preceding said current bit, called preceding bit, in a "ON" state;

estimating a video level encoded by said preceding bit on the basis of said number of pixels, and subtracting said video level encoded by said preceding bit from the video level to be encoded by the preceding bit and its following bits of the subfield code word.

7. Device for encoding a video level of a pixel of a picture to be displayed by a display device into a code word called subfield code word, a weight being associated with each bit of the subfield code word, each bit having a state "ON" or "OFF" and causing light emission during an own period, called sub-field, of a video frame when its state is "ON", the duration of the light emission period for said bit being proportional to the weight associated with said bit and wherein the bits of the subfield code word are computed recursively one after the other from the bit having the most significant weight to the bit having the least significant weight, characterized in that, for determining the state of a current bit of said subfield code word, the device comprises:

dithering means for associating (S1) a first threshold (MaxAPi) and a second threshold (HSVi) with said bit by applying a dithering function to the video level to be encoded by said current bit and the following bits of the subfield code word, whereby said second threshold (HSVi) is greater than said first threshold (MaxAPi), a first comparator circuit (105*i*) for comparing the dithered video level to the second threshold (HSVi) and allocating a state ON to said bit when said dithered video level is equal to or greater than the second threshold (HSVi), a first subtraction circuit (101*i*) to subtract the first threshold from the video level to be encoded by the current bit and the following bits of the subfield code word;

a second comparator circuit (102*i*) for comparing the video level outputted by the first subtraction circuit (101*i*) to zero and outputting the higher video level, a third comparator circuit (103*i*) for comparing the video level outputted by the second comparator circuit (102*i*) to the difference between the second threshold and the first threshold (MaxAPi) and outputting the lower value (APi), a first multiplication circuit (106*i*) for multiplying a fixed part value (FPi) associated with the subfield (SFi) of the current bit to the bit outputted by the first comparator circuit (105*i*) and outputting said fixed part value (FPi) if the state of said bit is ON and zero if the state of said bit is OFF, an adder circuit (107*i*) for adding the value (APi) outputted by the third comparator circuit (103*i*) to the video level outputted by the first multiplication circuit (106*i*), and a second subtraction circuit (108*i*) for subtracting the value outputted by the adder circuit (107*i*) from the video level to be encoded by the current bit and the following bits of the subfield code word and to provide a video level to be encoded by the following bits of the subfield code word.

8. Device according to claim 7, wherein, to compute the video level of a current pixel to be encoded by the bits of the subfield code word following the current bit, it further comprises a first line memory (109*i*) for delaying the video level to be encoded by the current bit and the following bits of one line period; to which the first subtraction circuit (101*i*) to subtract the first threshold from the video level delayed by the first line memory (109*i*) is applied, a load evaluation circuit (110*i*) for computing, for the subfield (SFi) associated with the current bit (Bi), the load (loadi) of the line of pixels to which the current pixel belongs, a luminance gain estimation circuit (111*i*) for estimating a luminance gain (Li) of the subfield (SFi) associated with the current bit (Bi) for said line of pixels on the basis on the load (loadi) of said line of pixels, a second line memory (112*i*) for delaying of one line period the current bit (Bi) outputted by the first comparator circuit (105*i*) and supplying the first multiplication circuit (106*i*) for multiplying a fixed part value (FPi) associated with the current bit to the bit delayed by the second line memory (111*i*) and outputting said fixed part value (FPi) if the state of said delayed current bit is ON and zero if the state of said delayed current bit is OFF, a second multiplication circuit (113*i*) for multiplying the video level outputted by the adder circuit (107*i*) to the luminance gain (Li) outputted by the luminance gain estimation circuit (111*i*), and a second subtraction circuit (108*i*) for subtracting the value outputted by the second multiplication circuit (113*i*) from the video level delayed by the first line memory (109*i*) to provide a video level to be encoded by the following bits of the subfield code word.

* * * * *